(12) United States Patent
Viripullan et al.

(10) Patent No.: US 8,328,514 B2
(45) Date of Patent: Dec. 11, 2012

(54) SYSTEM AND METHODS FOR DETERMINING A MONITOR SET POINT LIMIT FOR A WIND TURBINE

(75) Inventors: Renjith Viripullan, Karnataka (IN); Thomas Edenfeld, Osnabruck (DE); Vijendra Singh Chauhan, Karnataka (IN); Lothar Wittekind, Kiel (DE); Udo Ahmann, Emsdetten (DE)

(73) Assignee: General Electric Company, Schenectady, NY (US)

( * ) Notice: Subject to any disclaimer, the term of this patent is extended or adjusted under 35 U.S.C. 154(b) by 601 days.

(21) Appl. No.: 12/558,290

(22) Filed: Sep. 11, 2009

(65) Prior Publication Data

US 2011/0064573 A1 Mar. 17, 2011

(51) Int. Cl.
*B63H 3/06* (2006.01)
*B63H 3/10* (2006.01)
*F03D 7/00* (2006.01)

(52) U.S. Cl. ................. 416/35; 416/1; 416/61
(58) Field of Classification Search .......... 416/1
See application file for complete search history.

(56) References Cited

U.S. PATENT DOCUMENTS

| | | | |
|---|---|---|---|
| 3,671,814 A | 6/1972 | Dick | |
| 4,193,005 A | 3/1980 | Kos et al. | |
| 4,245,181 A | 1/1981 | Plunkett | |
| 4,339,666 A | 7/1982 | Patrick et al. | |
| 4,345,198 A | 8/1982 | Wolfinger | |
| 5,083,039 A | 1/1992 | Richardson et al. | |
| 5,225,712 A | 7/1993 | Erdman | |
| 6,057,622 A | 5/2000 | Hsu | |
| 6,361,275 B1 | 3/2002 | Wobben | |
| 6,525,504 B1 | 2/2003 | Nygren et al. | |
| 6,600,240 B2 | 7/2003 | Mikhail et al. | |
| 6,619,918 B1 | 9/2003 | Rebsdorf | |
| 6,703,718 B2 | 3/2004 | Calley et al. | |
| 6,809,431 B1 | 10/2004 | Schippmann | |
| 6,847,128 B2 | 1/2005 | Mikhail et al. | |
| 7,011,498 B2 | 3/2006 | Vos et al. | |
| 7,023,105 B2 * | 4/2006 | Wobben | 290/44 |
| 2004/0135375 A1 | 7/2004 | Wobben | |

(Continued)

FOREIGN PATENT DOCUMENTS

EP   2067989 A2   6/2009

OTHER PUBLICATIONS

"Wind Energy Explained: Theory, Design and Application"; Manwell, James F. et al. (Jun. 2002), John Wiley & sons Limited, pp. 197-246 and 321-367.

(Continued)

*Primary Examiner* — Ninh H Nguyen
*Assistant Examiner* — William Grigos
(74) *Attorney, Agent, or Firm* — James McGinness, Esq.; Armstrong Teasdale LLP (57) ABSTRACT

A method for controlling operation of a wind turbine is described. The wind turbine includes a rotor having a plurality of rotor blades. The method includes measuring an atmospheric condition associated with the environment surrounding the wind turbine, providing the measured atmospheric condition to a processor, and determining at least one monitor set point limit based at least partially on the measured atmospheric condition. The method also includes applying the at least one monitor set point limit to wind turbine operation.

29 Claims, 7 Drawing Sheets

U.S. PATENT DOCUMENTS

| | | |
|---|---|---|
| 2006/0002791 A1 | 1/2006 | Moroz |
| 2006/0112688 A1 | 6/2006 | Vos et al. |
| 2006/0273595 A1 * | 12/2006 | Avagliano et al. ............ 290/44 |
| 2007/0018457 A1 | 1/2007 | Llorente Gonzalez |
| 2007/0041837 A1 | 2/2007 | Ide et al. |
| 2007/0216166 A1 | 9/2007 | Schubert |
| 2008/0112807 A1 * | 5/2008 | Uphues et al. .................. 416/1 |

OTHER PUBLICATIONS

European Search Report issued in connection with corresponding EP application No. 10175268.1, Jul. 6, 2011.

* cited by examiner

SYSTEM AND METHODS FOR DETERMINING A MONITOR SET POINT LIMIT FOR A WIND TURBINE

BACKGROUND OF THE INVENTION

The field of the invention relates generally to control of wind turbine operation, and more specifically to determining monitor set point limits for a wind turbine based on a measured atmospheric condition.

Wind turbine generators utilize wind energy to produce electrical power. Wind turbine generators typically include a wind rotor having multiple blades that transform wind energy into rotational motion of a drive shaft, which in turn is utilized to drive a rotor of an electrical generator to produce electrical power.

Changes in atmospheric conditions, for example, wind speed, may significantly influence power produced by wind turbine generators. A power output of a wind turbine generator increases with wind speed until the wind speed reaches a rated wind speed for the turbine. At and above the rated wind speed, the turbine operates at a rated power. The rated power is a predetermined output power at which a wind turbine generator can operate with a level of fatigue to turbine components that is predetermined to be acceptable. At wind speeds higher than a certain speed, typically referred to as a "trip limit" or "monitor set point limit," wind turbines may be shut down, or the loads may be reduced by regulating the pitch of the blades or braking the rotor, in order to protect turbine components from damage. Static trip limits are typically determined during a design stage of the wind turbine and therefore are not dependent upon changing conditions that may be present during operation of the wind turbine. Typically, a wind turbine shut down is costly. Maintenance costs may be incurred in order to re-start the wind turbine and energy production is lost while the wind turbine remains shut down.

BRIEF DESCRIPTION OF THE INVENTION

In one aspect, a method for controlling operation of a wind turbine is provided. The wind turbine includes a rotor having a plurality of rotor blades. The method includes measuring an atmospheric condition associated with the environment surrounding the wind turbine, providing the measured atmospheric condition to a processor, and determining at least one monitor set point limit based at least partially on the measured atmospheric condition. The method also includes applying the at least one monitor set point limit to wind turbine operation.

In another aspect, a method for assembling a wind turbine configured to operate with at least one variable monitor set point limit is provided. The wind turbine includes a system controller. The method includes positioning an atmospheric condition sensor on or in close proximity to the wind turbine, coupling the atmospheric condition sensor to the system controller, and configuring the system controller to determine the at least one monitor set point limit based at least partially on an atmospheric condition measured by the atmospheric condition sensor.

In yet another aspect, a method for facilitating operating a wind turbine having at least one variable monitor set point limit is provided. The wind turbine includes a system controller. The method includes configuring an atmospheric condition sensor to provide the system controller with at least one atmospheric condition measurement. The method also includes configuring the system controller to receive the at least one atmospheric condition measurement, to determine the at least one variable monitor set point limit based at least partially on the at least one atmospheric condition measurement, and to apply the at least one variable monitor set point limit to wind turbine operation.

In yet another aspect, a wind turbine control system is provided. The wind turbine control system includes an atmospheric condition sensor positioned on or in close proximity to a body of the wind turbine. The atmospheric condition sensor is configured to measure at least one atmospheric condition. The system also includes a processor coupled to the atmospheric condition sensor. The processor is configured to receive at least one atmospheric condition measurement from the atmospheric condition sensor and to determine at least one monitor set point limit based at least partially on the at least one atmospheric condition measurement.

In yet another aspect, a computer program embodied on a computer readable medium for determining at least one monitor set point limit for a wind turbine is provided. The program includes at least one code segment that receives measured atmospheric condition data provided by an atmospheric condition sensor and determines at least one monitor set point limit for the wind turbine based at least partially on the received atmospheric condition data.

DETAILED DESCRIPTION OF THE INVENTION

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power. As used herein, the term "windmill" is intended to be representative of any wind turbine that uses rotational energy generated from wind energy, and more specifically mechanical energy converted from kinetic energy of wind, for a predetermined purpose other than generating electrical power, such as, but not limited to, pumping a fluid and/or grinding a substance.

Figure 1:
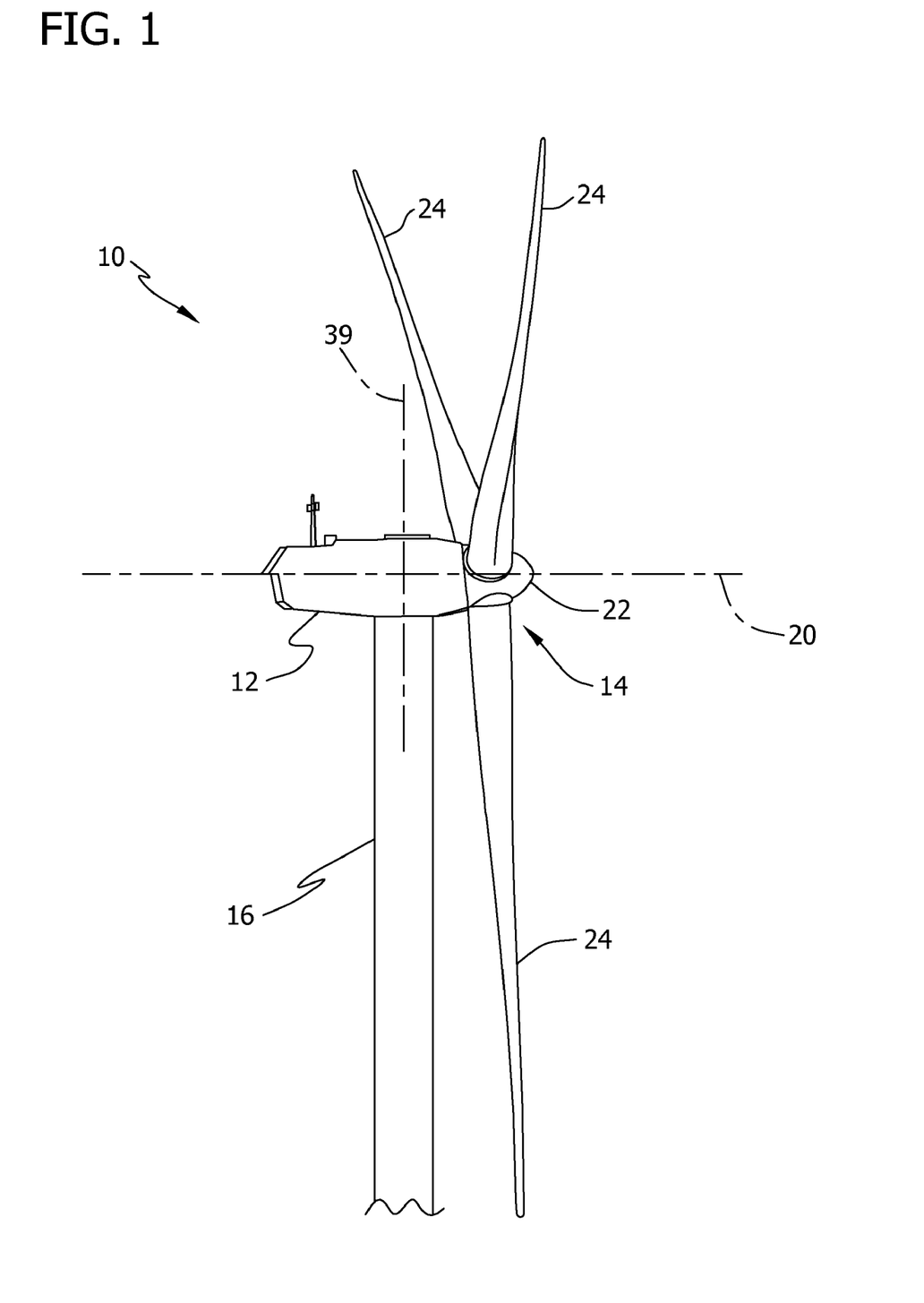
FIG. 1 is a perspective view of an exemplary wind turbine.
Figure 2:
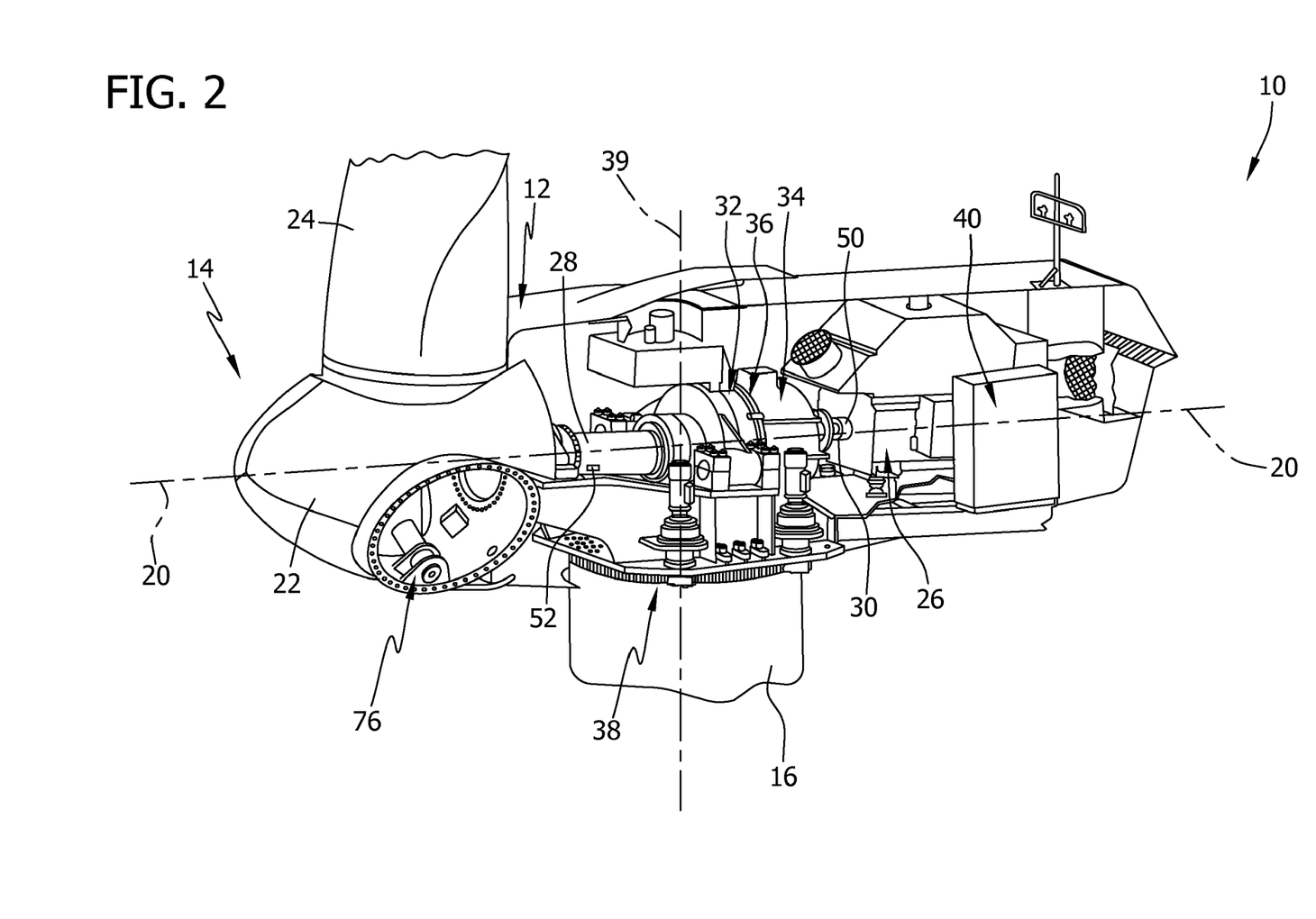
FIG. 2 is a partial cut-away perspective view of a portion of the wind turbine shown in FIG. 1.
Figure 3:
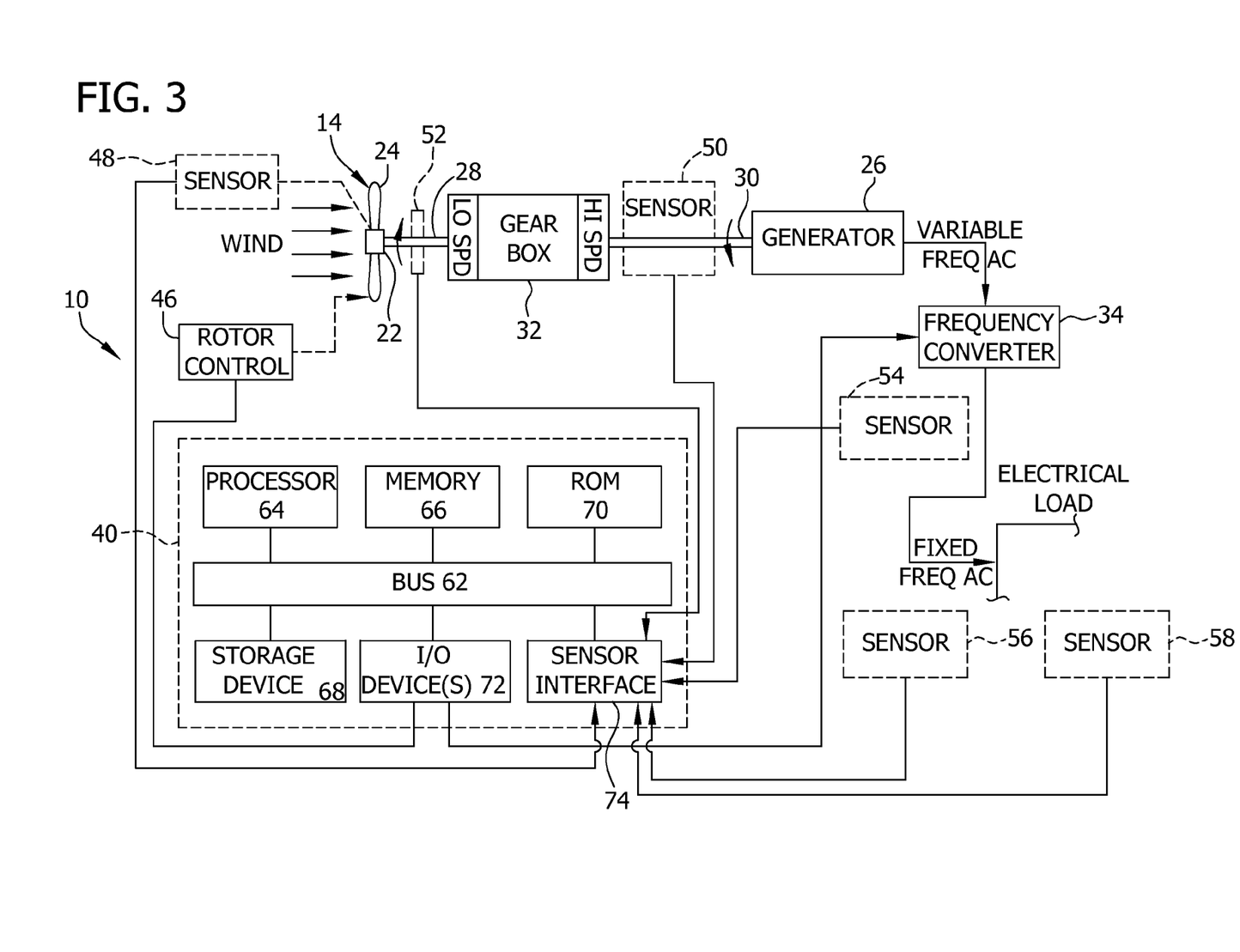
FIG. 3 is a schematic diagram of an exemplary wind turbine.

FIG. 1 is a perspective view of an exemplary wind turbine 10. FIG. 2 is a partially cut-away perspective view of a portion of wind turbine 10. Wind turbine 10 described and illustrated herein is a wind generator for generating electrical power from wind energy. However, in some embodiments, wind turbine 10 may be, in addition or alternative to a wind generator, any type of wind turbine, such as, but not limited to, a windmill (not shown). Moreover, wind turbine 10 described and illustrated herein includes a horizontal-axis configuration. However, in some embodiments, wind turbine 10 may include, in addition or alternative to the horizontal-axis configuration, a vertical-axis configuration (not shown). Wind turbine 10 may be coupled to an electrical load (not shown), such as, but not limited to, a power grid (not shown), for receiving electrical power therefrom to drive operation of wind turbine 10 and/or its associated components and/or for supplying electrical power generated by wind turbine 10 thereto. Although only one wind turbine 10 is shown in FIGS. 1-3, in some embodiments, a plurality of wind turbines 10 may be grouped together, sometimes referred to as a "wind farm."

Wind turbine 10 includes a body 12, sometimes referred to as a "nacelle," and a rotor (generally designated by 14) coupled to body 12 for rotation with respect to body 12 about an axis of rotation 20. In the exemplary embodiment, nacelle 12 is mounted on a tower 16. However, in some embodiments, in addition or alternative to tower-mounted nacelle 12, wind turbine 10 includes a nacelle 12 adjacent the ground and/or a surface of water. The height of tower 16 may be any suitable height enabling wind turbine 10 to function as described herein. Rotor 14 includes a hub 22 and a plurality of blades 24 (sometimes referred to as "airfoils") extending radially outwardly from hub 22 for converting wind energy into rotational energy. Although rotor 14 is described and illustrated herein as having three blades 24, rotor 14 may have any number of blades 24. Blades 24 may each have any length that allows wind turbine 10 to function as described herein. For example, in some embodiments, one or more rotor blades 24 are about one-half meter long, while in some embodiments one or more rotor blades 24 are about fifty meters long. Other examples of blade 24 lengths include ten meters or less, about twenty meters, about thirty-seven meters, and about forty meters. Still other examples include rotor blades between about fifty and about one-hundred meters long.

Despite how rotor blades 24 are illustrated in FIG. 1, rotor 14 may have blades 24 of any shape, and may have blades 24 of any type and/or any configuration, whether such shape, type, and/or configuration is described and/or illustrated herein. One example of another type, shape, and/or configuration of rotor blades 24 is a ducted rotor (not shown) having a turbine (not shown) contained within a duct (not shown). Another example of another type, shape, and/or configuration of rotor blades 24 is a darrieus wind turbine, sometimes referred to as an "eggbeater" turbine. Yet another example of another type, shape, and/or configuration of rotor blades 24 is a savonious wind turbine. Even another example of another type, shape, and/or configuration of rotor blades 24 is a traditional windmill for pumping water, such as, but not limited to, four-bladed rotors having wooden shutters and/or fabric sails. Moreover, wind turbine 10 may, in some embodiments, be a wind turbine wherein rotor 14 generally faces upwind to harness wind energy, and/or may be a wind turbine wherein rotor 14 generally faces downwind to harness energy. Of course, in any of the embodiments, rotor 14 may not face exactly upwind and/or downwind, but may face generally at any angle (which may be variable) with respect to a direction of the wind to harness energy therefrom.

Referring now to FIGS. 2, wind turbine 10 includes an electrical generator 26 coupled to rotor 14 for generating electrical power from the rotational energy generated by rotor 14. Generator 26 may be any suitable type of electrical generator, such as, but not limited to, a wound rotor induction generator. Generator 26 includes a stator (not shown) and a rotor (not shown). Rotor 14 includes a rotor shaft 28 coupled to rotor hub 22 for rotation therewith. Generator 26 is coupled to rotor shaft 28 such that rotation of rotor shaft 28 drives rotation of the generator rotor, and therefore operation of generator 26. In the exemplary embodiment, the generator rotor has a generator shaft 30 coupled thereto and coupled to rotor shaft 28 such that rotation of rotor shaft 28 drives rotation of the generator rotor. In other embodiments, the generator rotor is directly coupled to rotor shaft 28, sometimes referred to as a "direct-drive wind turbine." In the exemplary embodiment, generator shaft 30 is coupled to rotor shaft 28 through a gearbox 32, although in other embodiments generator shaft 30 is coupled directly to rotor shaft 28.

The torque of rotor 14 drives the generator rotor to thereby generate variable frequency AC electrical power from rotation of rotor 14. Generator 26 has an air gap torque between the generator rotor and stator that opposes the torque of rotor 14. A frequency converter 34 is coupled to generator 26 for converting the variable frequency AC to a fixed frequency AC for delivery to an electrical load (not shown), such as, but not limited to a power grid (not shown), coupled to generator 26. Frequency converter 34 may be located anywhere within or remote to wind turbine 10. For example, frequency converter 34 may be located within a base (not shown) of tower 16.

In some embodiments, wind turbine 10 may include a rotor speed limiter, for example, but not limited to a disk brake 36. Disk brake 36 brakes rotation of rotor 14 to, for example, slow rotation of rotor 14, brake rotor 14 against full wind torque, and/or reduce the generation of electrical power from electrical generator 26. Furthermore, in some embodiments, wind turbine 10 may include a yaw system 38 for rotating nacelle 12 about an axis of rotation 39 for changing a yaw of rotor 14, and more specifically for changing a direction faced by rotor 14 to, for example, adjust an angle between the direction faced by rotor 14 and a direction of wind.

FIG. 3 is a block diagram of an exemplary embodiment of wind turbine 10. In the exemplary embodiment, wind turbine 10 includes one or more system controllers 40 coupled to some or all of the components of wind turbine 10 for generally controlling operation of wind turbine 10 and/or controlling operation of some or all of the components thereof, regardless of whether such components are described and/or illustrated herein. For example, in the exemplary embodiment system controller 40 is coupled to a rotor control 46 for generally controlling rotor 14. In the exemplary embodiment, system controller 40 is mounted within nacelle 12 (shown in FIG. 2). However, additionally or alternatively, one or more system controllers 40 may be remote from nacelle 12 and/or other components of wind turbine 10. System controller 40 may be used for, but is not limited to, overall system monitoring and control including, for example, pitch and speed regulation, high-speed shaft and yaw brake application, yaw and pump motor application, and/or fault monitoring. Alternative distributed or centralized control architectures may be used in some embodiments.

In an exemplary embodiment, wind turbine 10 includes a plurality of sensors, for example, sensors 48, 50, 52, 54, 56, and 58. Sensors 48, 50, 52, 54, 56, and 58 measure a variety of parameters, including, but not limited to, operating conditions and atmospheric conditions. Each of sensors 48, 50, 52, 54, 56, and 58 may be an individual sensor or a plurality of sensors. Sensors 48, 50, 52, 54, 56, and 58 may be any suitable sensor having any suitable location within or remote to wind turbine 10 that allows wind turbine 10 to function as described herein. In some embodiments, sensors 48, 50, 52, 54, 58, and 58 are coupled to system controller 40 for transmitting measurements to system controller 40 for processing thereof.

In some embodiments, system controller 40 includes a bus 62 or other communications device to communicate information. One or more processor(s) 64 are coupled to bus 62 to process information, including information from sensors 48, 50, 52, 54, 56, 58 and/or other sensor(s). System controller 40 may also include one or more random access memories (RAM) 66 and/or other storage device(s) 68. RAM(s) 66 and storage device(s) 68 are coupled to bus 62 to store and transfer information and instructions to be executed by processor(s) 64. RAM(s) 66 (and/or also storage device(s) 68, if included) can also be used to store temporary variables or other intermediate information during execution of instructions by processor(s) 64. System controller 40 may also include one or more read only memories (ROM) 70 and/or other static storage devices coupled to bus 62 to store and provide static (i.e., non-changing) information and instructions to processor(s) 64.

System controller 40 may also include, or may be coupled to, input/output device(s) 72. Input/output device(s) 72 may include any device known in the art to provide input data to system controller 40 and/or to provide outputs, such as, but not limited to, yaw control and/or pitch control outputs. Instructions may be provided to memory 66 from storage device 68, such as, but not limited to, a magnetic disk, a read-only memory (ROM) integrated circuit, CD-ROM, and/or DVD, via a remote connection that is either wired or wireless providing access to one or more electronically-accessible media, etc. In some embodiments, hard-wired circuitry can be used in place of or in combination with software instructions. Thus, execution of sequences of instructions is not limited to any specific combination of hardware circuitry and software instructions, whether described and/or illustrated herein. System controller 40 may also include a sensor interface 74 that allows system controller 40 to communicate with sensors 48, 50, 52, 54, 56, 58 and/or other sensor(s). Sensor interface 74 may include one or more analog-to-digital converters that convert analog signals into digital signals that can be used by processor(s) 64.

Wind turbine 10 is generally configured to operate at a rated power set point. The rated power set point is a predetermined output power at which wind turbine 10 can operate with a level of fatigue to turbine components that is predetermined to be acceptable. Typically, the rated power set point is static. Furthermore, certain operating conditions of wind turbine 10 are monitored and compared to stored monitor set point limits (i.e., trip limits). Typically, the monitor set point limits are static, pre-set limits. Typically, if a measured operating condition violates a stored monitor set point limit (e.g., meets or exceeds the stored monitor set point limit), wind turbine 10 is shut down. Examples of monitor set point limits include, but are not limited to, a generator shaft rotation speed monitor set point limit, a generator shaft torque monitor set point limit, a blade pitch asymmetry monitor set point limit, an electrical power output monitor set point limit, a wind turbine vibration monitor set point limit, and a wind turbine component temperature monitor set point limit.

More specifically, in an exemplary embodiment, sensors 48, 50, 52, 54, and 56 measure operating conditions of wind turbine 10. Sensor 48 may include multiple sensors, each sensor coupled to a corresponding blade 24 for measuring a pitch of each blade 24, or more specifically an angle of each blade 24 with respect to a wind direction and/or with respect to rotor hub 22. The measured pitch of one blade 24 is compared to the measured pitch of another blade 24 to determine a pitch asymmetry. Typically, if the pitch asymmetry is determined to be greater than a static, pre-set blade pitch asymmetry monitor set point limit, wind turbine 10 is shut down.

In an exemplary embodiment, one or more sensors 50 are coupled to generator shaft 30 for measuring a speed of rotation and/or a torque on generator shaft 30. Moreover, in an exemplary embodiment, one or more sensors 52 are coupled to rotor shaft 28 for measuring a speed of rotation of rotor shaft 28 and/or a torque on rotor shaft 28. Typically, if the measured speed of rotation of rotor shaft 28 and/or generator shaft 30 is greater than a static, pre-set shaft rotation speed monitor set point limit, wind turbine 10 is shut down. The shaft rotation speed monitor set point limit may also be referred to herein as an over speed monitor set point limit.

Furthermore, in the exemplary embodiment, one or more sensors 54 are coupled to generator 26 for measuring an electrical power output of generator 26. Typically, if the measured electrical power output of generator 26 meets or exceeds a static, pre-set electrical power output monitor set point limit, wind turbine 10 is shut down.

In the exemplary embodiment, wind turbine 10 also includes sensor 56, which is coupled to system controller 40 via sensor interface 74. In the exemplary embodiment, sensor 56 measures temperatures and vibration levels of components or materials within wind turbine 10 during operation of wind turbine 10. Typically, if a measured operating temperature or operating vibration level exceeds a static, pre-set temperature or vibration level monitor set point limit, wind turbine 10 is shut down. For example, if a measured gearbox oil temperature exceeds a pre-set operational temperature monitor set point limit, wind turbine 10 may be shut down.

In the exemplary embodiment, wind turbine 10 also includes atmospheric condition sensor 58 coupled to system controller 40 via sensor interface 74. Atmospheric condition sensor 58 may include one or more individual sensors configured to measure conditions of the environment surrounding wind turbine 10, for example, but not limited to, an ambient air temperature, an ambient air pressure, an ambient air density, a wind speed, a wind shear, and an air turbulence intensity. Atmospheric conditions measured by sensor 58 are provided to system controller 40, and may be used by system controller 40 alone or in combination with environmental condition data stored in, for example, storage device 68. In the exemplary embodiment, system controller 40 determines at least one monitor set point limit based at least partially on the measured atmospheric conditions and/or stored environmental condition data.

The effect wind has on wind turbine 10 is dependent on atmospheric conditions of the environment where wind turbine 10 is positioned. For example, relatively low air pressure periods of time typically correspond to periods of time having high wind speeds. Also, air pressure corresponds to air density, therefore, relatively low air pressure periods of time correspond to relatively low air density. Air density impacts the load spectrum of wind turbine 10. Higher air density produces higher wind turbine loads. For example, denser air imparts more force on wind turbine blades 24 than less dense air at the same wind speed. Furthermore, due to the greater forces imparted on blades 24, wind gusts have a greater effect on wind turbine 10 during periods of relatively high air density.

In the exemplary embodiment, applying variable monitor set point limits facilitates reducing unnecessary shut downs of wind turbine 10 when compared to the application of static, pre-set monitor set point limits. In the exemplary embodiment, the variable monitor set point limits are based at least partially on a measured atmospheric condition and/or a measured operating condition. As described above, in at least some embodiments, measured operating conditions may include, but are not limited to, temperatures and/or vibration levels of components or materials within wind turbine 10. Also, in at least some embodiments, measured atmospheric conditions may include, but are not limited to, an ambient air temperature, an ambient air pressure, an ambient air density, a wind speed, a wind shear, and an air turbulence intensity.

For example, during periods of time with relatively low wind shear, it may be determined that applying a modified monitor set point limit would not increase a stress on wind turbine 10 beyond a level of stress present on wind turbine 10 during normal wind shear conditions at the static, pre-set monitor set point limits. More specifically, during periods of time with relatively low wind shear, it may be determined that applying a higher yaw error monitor set point limit than a static pre-set yaw error monitor set point limit would not increase stress on wind turbine 10 beyond a level of stress present on wind turbine 10 during normal wind shear conditions at the static, pre-set yaw error monitor set point limit.

In the exemplary embodiment, atmospheric condition sensor 58 also measures an air turbulence intensity and provides system controller 40 with turbulence intensity data. System controller 40 may then determine the variable monitor set point limit based at least partially on the air turbulence intensity. In an alternative embodiment, a turbulence intensity value is stored in storage device 68. For example, the turbulence intensity value is determined based on a wind turbulence assessment performed at the location where wind turbine 10 is positioned. The wind turbulence assessment is performed over a period of time, to determine a static turbulence intensity value for a wind turbine positioned at a particular location. Although the turbulence intensity value is a static value, the turbulence intensity value may be periodically re-determined using data from atmospheric condition sensor 58 and again stored in, for example, storage device 68.

In at least some embodiments, the variable monitor set point limit is based at least partially on an ambient air temperature. Atmospheric condition sensor 58, in one embodiment, measures air temperature and system controller 40 determines at least one variable monitor set point limit based at least partially on the measured air temperature. In at least some embodiments, the variable monitor set point limit is based at least partially on ambient air density. Atmospheric condition sensor 58 may directly measure the air density of the environment where wind turbine 10 is positioned. Alternatively, the air density may be determined using a combination of measured and stored data. For example, it is known that air temperature is inversely related to air density. At a given altitude, air will have a greater air density at a lower temperature than the air would have at a higher temperature. Conversely, at a given altitude, air will have a lower air density at a higher temperature than the air would have at a lower temperature. In the alternative exemplary embodiment, atmospheric condition sensor 58 may measure the ambient air temperature (e.g., a dry-bulb temperature), which typically will vary over time. Wind turbine 10 is typically installed at a fixed altitude, which may be stored in storage device 68. The altitude at which wind turbine 10 is installed includes the elevation of the land on which wind turbine 10 is installed, in addition to a length of tower 16 (shown in FIG. 1). The altitude may also be referred to as a "hub height," which is the altitude of axis of rotation 20 (shown in FIG. 1). The air density may be calculated by system controller 40 using the measured air temperature and the stored altitude.

Furthermore, in at least some embodiments, a variable rated power set point may also be determined based at least partially on the measured atmospheric conditions. For example, system controller 40 may determine the variable rated power set point based at least partially on data from atmospheric condition sensor 58. In some embodiments, the rated power set point may be determined based at least partially on the measured air pressure level. The measured air pressure level may be compared to a stored air pressure level and corresponding rated power set point. Alternatively, system controller 40 may modify a pre-set rated power set point based on the measured atmospheric conditions. For example, during the manufacture of wind turbine 10, a pre-set rated power set point may be determined for wind turbine 10 and programmed into system controller 40. Alternatively, during testing of wind turbine 10, a pre-set rated power set point may be determined for wind turbine 10 and programmed into system controller 40.

In an exemplary embodiment, wind turbine 10 includes a variable blade pitch system 76 for controlling, including but not limited to changing, a pitch angle of rotor blades 24 (shown in FIGS. 1-3) with respect to a wind direction. Pitch system 76 may be coupled to system controller 40 (shown in FIG. 2) for control thereby. Pitch system 76 is coupled to hub 22 and blades 24 for changing the pitch angle of blades 24 by rotating blades 24 with respect to hub 22. The pitch actuators may include any suitable structure, configuration, arrangement, means, and/or components, whether described and/or illustrated herein, such as, but not limited to, electrical motors, hydraulic cylinders, springs, and/or servomechanisms. Moreover, the pitch actuators may be driven by any suitable means, whether described and/or illustrated herein, such as, but not limited to, hydraulic fluid, electrical power, electro-chemical power, and/or mechanical power, such as, but not limited to, spring force.

Figure 4:
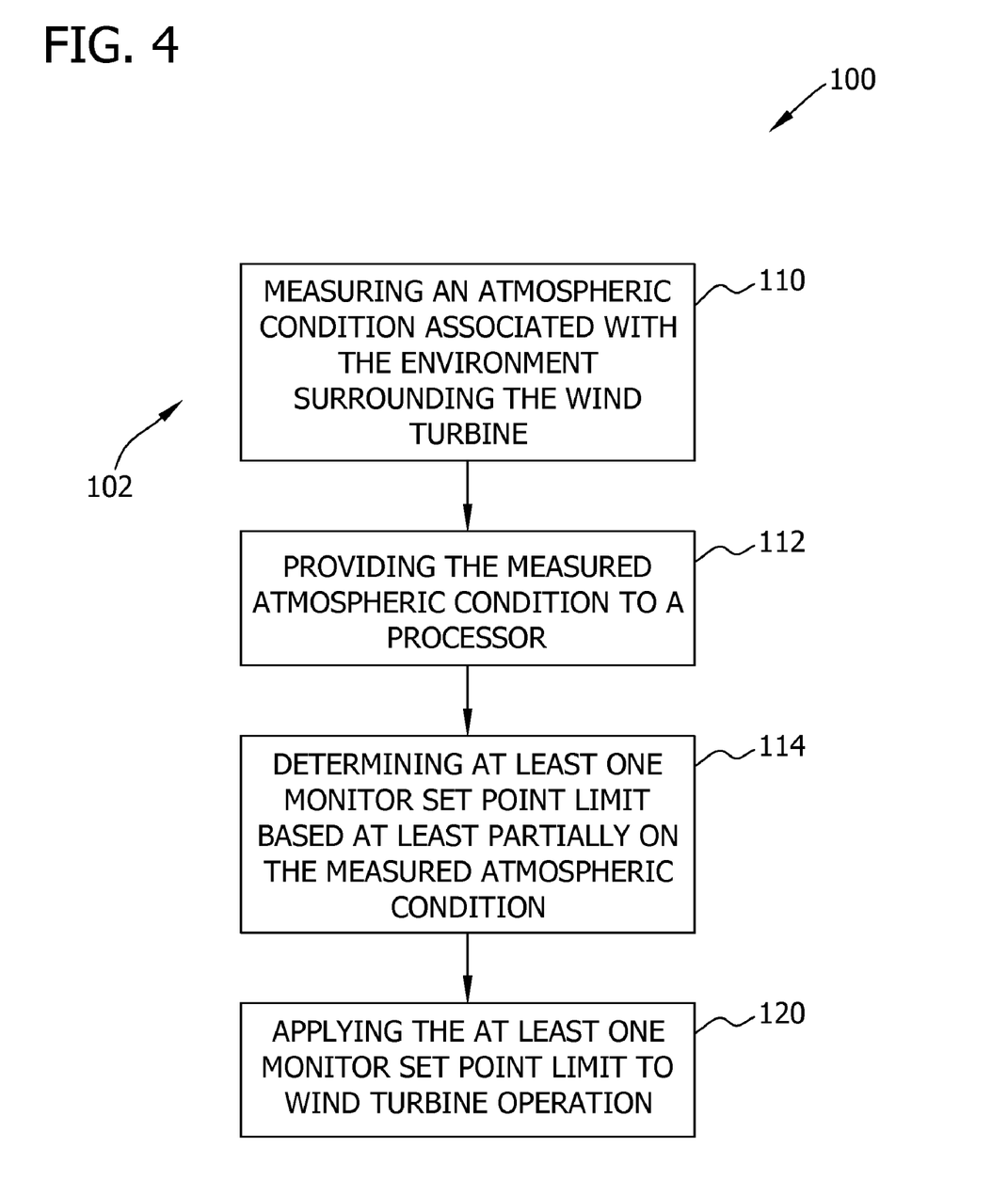
FIG. 4 is a flowchart of an exemplary method for controlling operation of a wind turbine.

FIG. 4 is a flowchart 100 of an exemplary method 102 for controlling operation of a wind turbine, for example, wind turbine 10 (shown in FIG. 1). Method 102 includes measuring 110 an atmospheric condition associated with the environment surrounding wind turbine 10. As described above, atmospheric conditions may include an ambient air temperature, an ambient air pressure, an ambient air density, a wind speed, and/or a wind turbulence intensity. The method also includes providing 112 the measured atmospheric condition to a processor, for example, processor 64 of system controller 40 (shown in FIG. 3). The method also includes determining 114 at least one monitor set point limit based at least partially on the measured 110 atmospheric condition. In some exemplary embodiments, determining 114 the monitor set point limit includes comparing the measured 110 atmospheric condition to a stored monitor set point limit/potential atmospheric condition combination.

In some embodiments, an over speed set point limit, a blade pitch asymmetry set point limit, an operating temperature set point limit, and/or an operating vibration level set point limit may be determined 114 based on the measured atmospheric condition. For example, processor 64 may receive a measured air density and determine the over speed set point limit based on the measured air density. Alternatively, as described above, processor 64 may determine the over speed set point limit using any measured atmospheric conditions in combination with stored data. More specifically, processor 64 may determine the air density using the measured 110 air temperature, and at least one of a stored barometric pressure and a stored turbulence intensity value. As described above, the barometric pressure of air surrounding wind turbine 10 corresponds to the altitude at which wind turbine 10 is positioned. As is also described above, the turbulence intensity value is a fixed value determined after a wind turbulence assessment. Therefore, the air density may be determined based on the fixed barometric pressure and turbulence intensity values, and the measured 110 air temperature. Since denser air imparts more force on wind turbine blades than less dense air at the same wind speed, higher monitor set point limits may be applied when temperatures are conducive.

In some example embodiments, determining 114 the monitor set point limit based at least partially on the measured 110 atmospheric condition also includes modifying a pre-set monitor set point limit based on the measured 110 atmospheric condition. For example, during the manufacture of wind turbine 10, a pre-set monitor set point limit may be determined for wind turbine 10 and programmed into system controller 40. Alternatively, during testing of wind turbine 10, a pre-set monitor set point limit may be determined for wind turbine 10 and programmed into system controller 40. As described above, the monitor set point limits are trip limits that when violated, indicate that wind turbine 10 should be shut down. In the exemplary embodiment, atmospheric condition sensor 58 (shown in FIG. 3) facilitates modifying a pre-set monitor set point limit based at least partially on the measured 110 atmospheric condition.

In the exemplary embodiment, modifying the pre-set monitor set point limit includes increasing the pre-set monitor set point limit by a predetermined amount when the measured 110 atmospheric condition is above a predetermined level. As described above, in relative terms, when the temperature is high at a given altitude, the air density is low. Therefore, the force the wind will impart on a rotor blade, for example, rotor blade 24 (shown in FIG. 1), is also lower than when the air temperature is lower. Also, wind turbine 10 will be less influenced by high wind gusts when the air temperature is high, and corresponding air density is low, because those high wind gusts do not impart as much force on wind rotor blades 24 (shown in FIG. 1) as an equal level of wind gust would impart on wind rotor blades 24 under lower air temperature conditions. Providing 112 the measured atmospheric condition to system controller 40, and determining 114 the monitor set point limit based at least partially on the measured 110 atmospheric condition, facilitates increasing a monitor set point limit when air density conditions are conducive, and therefore, potentially preventing unnecessary shutdowns of wind turbine 10 without raising the risk of damaging wind turbine 10 or adding fatigue to wind turbine 10 operation.

Method 102 also includes applying 120 the at least one monitor set point limit to wind turbine operation. Applying 120 may include shutting down wind turbine 10 if the monitor set point limit is violated. In the exemplary embodiment, at least one operating condition associated with operation of wind turbine 10 is monitored. For example, a rotational speed of a shaft (e.g., shaft 30, shown in FIG. 2), a vibration level, a variation of wind across a horizontal and vertical plane of wind turbine 10, an operating temperature of a component, a blade angle, and/or a yaw error may be measured. If a measured operating condition meets or exceeds the monitor set point limit, wind turbine 10 is shut down. For example, applying 120 may include determining operating instructions for adjustable components of wind turbine 10 that facilitate a shut down of wind turbine 10. More specifically, determining operating instructions for adjustable components of wind turbine 10 may include, but is not limited to including, determining operating instructions for a rotor speed limiting system, for example, but not limited to, disk brake 36 (shown in FIG. 2), and for a rotor blade pitch system, for example, rotor blade pitch system 76 (shown in FIG. 2). Therefore, applying 120 may include controlling disk brake 36 (shown in FIG. 2), and controlling rotor blade pitch system 76 (shown in FIG. 2).

Figure 5:
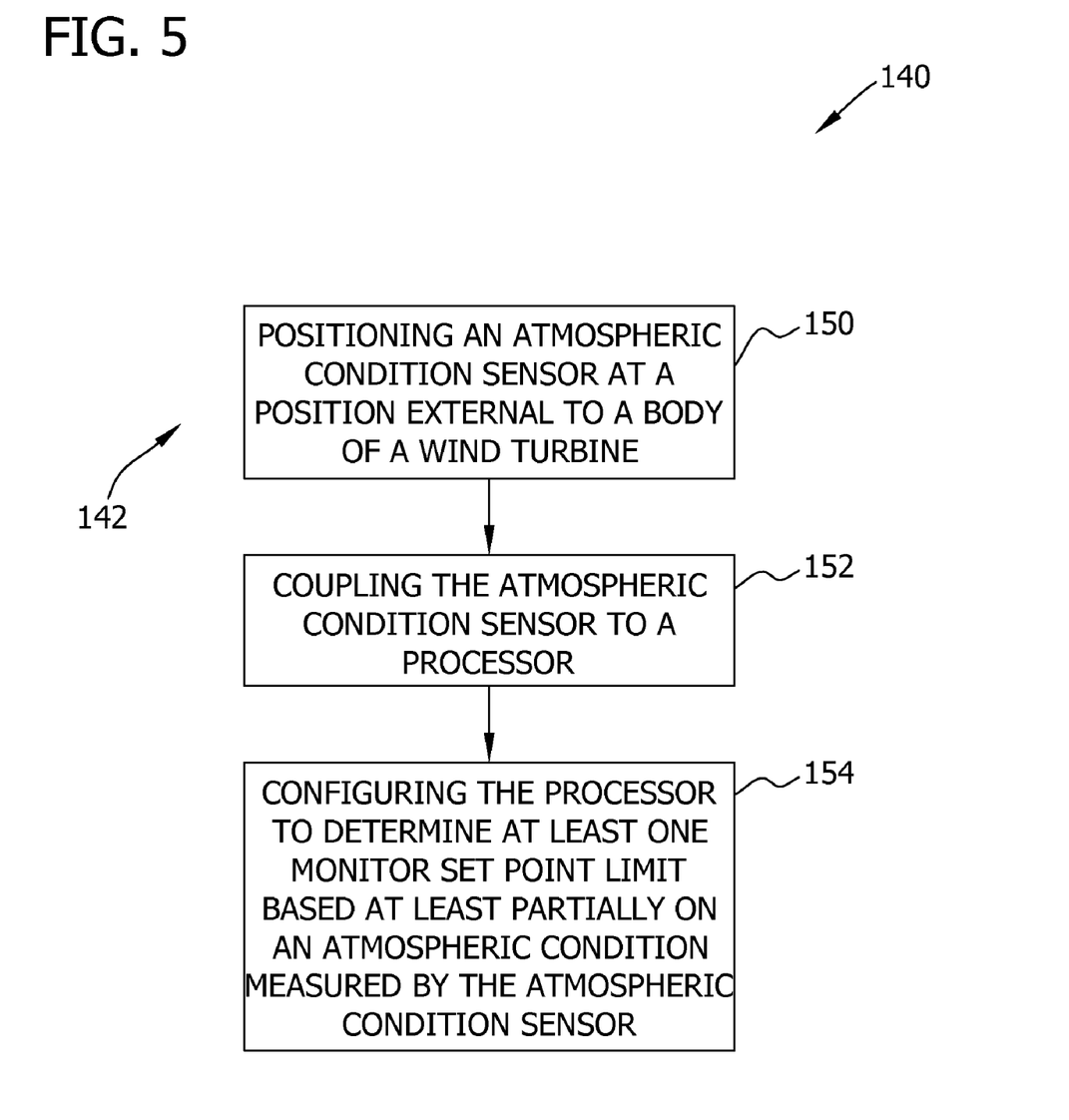
FIG. 5 is a flowchart of an exemplary method for assembling a wind turbine configured to operate with a variable monitor set point limit.

FIG. 5 is a flowchart 140 of an exemplary method 142 for assembling a wind turbine, for example wind turbine 10 (shown in FIG. 1), configured to operate with at least one variable monitor set point limit. Method 142 includes positioning 150 an atmospheric condition sensor at a position external to a body of a wind turbine. For example, atmospheric condition sensor 58 (shown in FIG. 3) may be positioned external to body 12 (shown in FIG. 1) of wind turbine 10 (shown in FIG. 1). Atmospheric condition sensor 58 may also be positioned 150 on an external surface of body 12 or tower 16 (shown in FIG. 1), positioned remotely from wind turbine 10, or positioned at any other position that allows determination of the atmospheric condition of the environment in which wind turbine 10 is installed. In the exemplary embodiment, method 142 also includes coupling 152 atmospheric condition sensor 58 to a processor, for example, processor 64 (shown in FIG. 3).

In the exemplary embodiment, method 142 also includes configuring 154 processor 64 to determine at least one monitor set point limit based at least partially on an atmospheric condition measured by the atmospheric condition sensor. In some embodiments, processor 64 is configured 154 to periodically determine the monitor set point limit at predetermined intervals of time. For example, processor 64 may be configured 154 to determine the monitor set point limit of wind turbine 10 once every minute. In another example, processor 64 may be configured 154 to determine the monitor set point limit of wind turbine 10 once every five minutes. In yet another example, processor 64 may be configured 154 to continuously determine the monitor set point limit of wind turbine 10 based at least partially on the measured atmospheric condition.

As described above, in an exemplary embodiment, processor 64 is included within system controller 40 (shown in FIG. 3). In some example embodiments, processor 64 is configured to compare a measured atmospheric condition to a stored atmospheric condition to determine corresponding monitor set point limits. Also, in some embodiments, processor 64 is further configured to modify a pre-set monitor set point limit by an amount determined by the comparison of measured atmospheric condition to stored atmospheric condition and corresponding monitor set point limits. Method 142 facilitates assembling wind turbine 10 to include atmospheric condition sensor 58, which facilitates operating wind turbine 10 with a variable monitor set point limit. Although described as a method for assembling wind turbine 10, method 142 illustrated in FIG. 5 also facilitates retrofitting a currently operational wind turbine with atmospheric condition sensor 58, and the ability to calculate a variable monitor set point limit based at least partially on the measured atmospheric condition.

Figure 6:
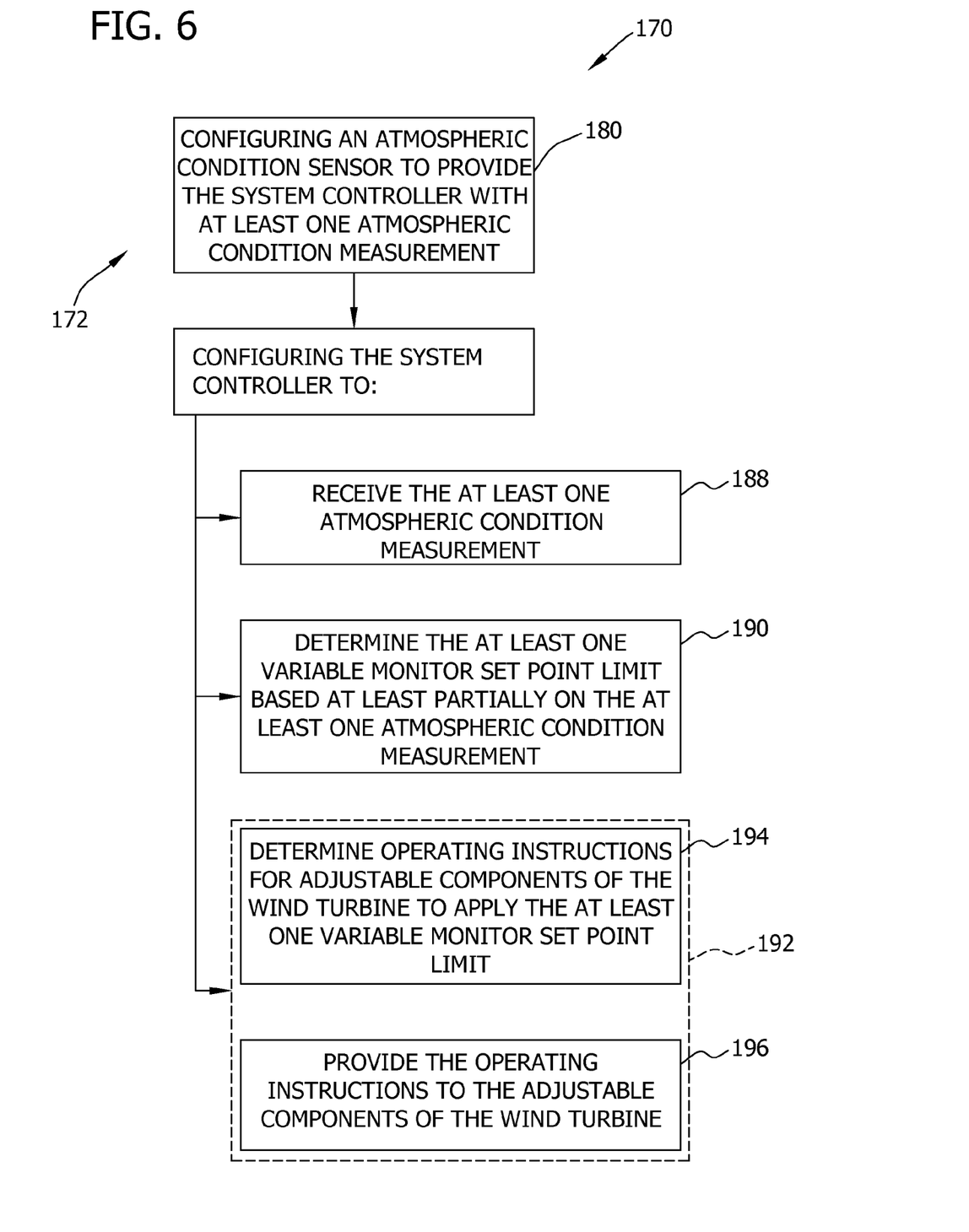
FIG. 6 is a flowchart of an exemplary method for facilitating operation of a wind turbine having a variable monitor set point limit.

FIG. 6 is a flowchart 170 of an exemplary method 172 for facilitating operating a wind turbine, for example, wind turbine 10 (shown in FIG. 1), having at least one variable monitor set point limit. In the exemplary embodiment, method 172 includes configuring 180 an atmospheric condition sensor, for example, atmospheric condition sensor 58 (shown in FIG. 3) to provide wind turbine 10 with at least one atmospheric condition measurement. More specifically, atmospheric condition sensor 58 is configured 180 to provide a system controller of wind turbine 10, for example, system controller 40 (shown in FIG. 3), with atmospheric condition measurements. Method 172 also includes configuring system controller 40 to receive 188 the atmospheric condition measurements, to determine 190 the at least one variable monitor set point limit based at least partially on the measured atmospheric conditions, and to apply 192 the at least one variable monitor set point limit to operation of wind turbine 10. In some embodiments, applying 192 the at least one variable monitor set point limit includes determining 192 operating instructions for adjustable components of wind turbine 10 and providing 196 the operating instructions to adjustable components of wind turbine 10.

Configuring system controller 40 to determine 190 the monitor set point limit based at least partially on the measured atmospheric condition may include storing predetermined monitor set point limits and corresponding potential atmospheric conditions in a memory, for example, ROM 70 (shown in FIG. 3). Configuring system controller 40 to determine 190 the monitor set point limit may also include comparing the measured atmospheric condition to the stored potential atmospheric conditions and corresponding monitor set point limits. In some example embodiments, configuring system controller 40 to determine 190 the monitor set point limit based at least partially on the measured atmospheric condition also includes modifying a pre-set monitor set point limit based on the measured atmospheric condition. For example, during the manufacture of wind turbine 10, a monitor set point limit may be determined for wind turbine 10 and programmed into system controller 40. Alternatively, during testing of wind turbine 10, a monitor set point limit may be determined for wind turbine 10 and programmed into system controller 40. As described above, the monitor set point limits are trip limits that when violated, indicate that wind turbine 10 should be shut down. In the exemplary embodiment, atmospheric condition sensor 58 (shown in FIG. 3) facilitates modifying a pre-set monitor set point limit based at least partially on the received 188 atmospheric condition measurement.

As described above with respect to method 102 illustrated in FIG. 4, modifying the pre-set monitor set point limit includes increasing the pre-set monitor set point limit by a predetermined amount when the measured atmospheric condition is above a predetermined level. Configuring system controller 40 to determine 190 the monitor set point limit based at least partially on the measured air temperature, and to determine 194 operating instructions for adjustable components of the wind turbine to apply the monitor set point limit facilitates preventing unnecessary wind turbine shut downs without raising the risk of damaging wind turbine 10 or adding fatigue to wind turbine 10 operation.

Figure 7:
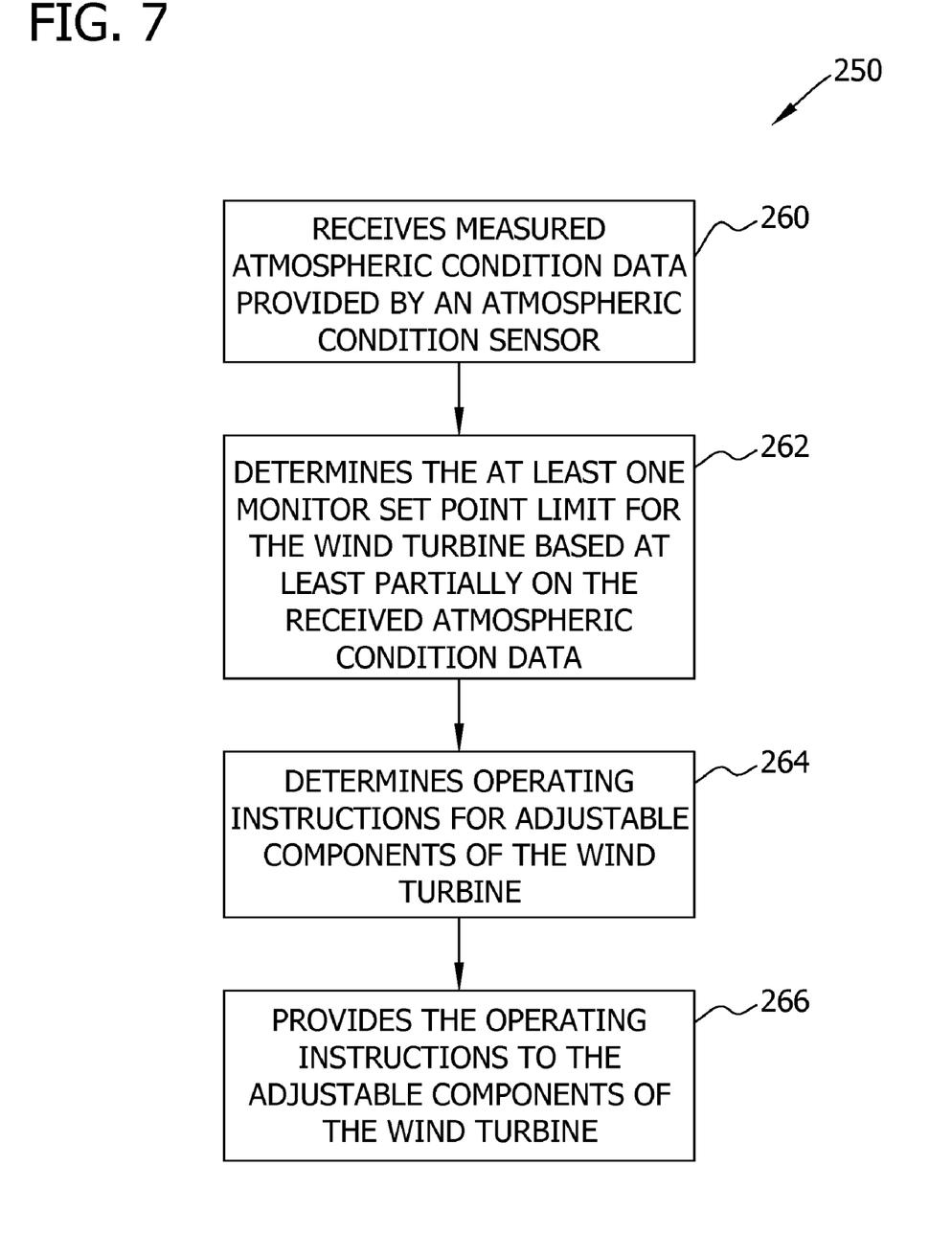
FIG. 7 is a flowchart of an exemplary process executed by the wind turbine control system shown in FIG. 2.

FIG. 7 is a flowchart 250 of an exemplary process executed by a wind turbine system controller, for example, system controller 40 (shown in FIG. 2) of wind turbine 10 (shown in FIG. 2). Flowchart 250 illustrates steps of an exemplary computer program embodied on a computer readable medium for determining at least one monitor set point limit for wind turbine 10. The computer program illustrated in flowchart 250 includes at least one code segment that receives 260 atmospheric condition data provided by an atmospheric condition sensor, for example, atmospheric condition sensor 58 (shown in FIG. 3). The computer program illustrated in flowchart 250 also includes at least one code segment that determines 262 the at least one monitor set point limit for wind turbine 10 based at least partially on the received atmospheric condition data. Furthermore, the computer program illustrated in flowchart 250 may also include at least one code segment that determines 264 operating instructions for adjustable components of wind turbine 10, and provides 266 the operating instructions to the adjustable components of wind turbine 10. As described above with respect to flowcharts 100, 140, and 170, the process illustrated in flowchart 250 facilitates varying the monitor set point limit of wind turbine 10 based at least partially on a measured atmospheric condition.

The above described system and methods for operating a wind turbine facilitate cost effective and highly reliable operation of the wind turbine. A technical effect of the system and methods described herein includes at least one of determining at least one monitor set point limit for a wind turbine based at least partially on a measured atmospheric condition and applying the variable monitor set point limit to operation of the wind turbine. The ability to determine a variable monitor set point limit that is dependent upon atmospheric conditions facilitates reducing unnecessary shut downs of the wind turbine while maintaining fatigue protection for turbine components. More specifically, the above described system and methods facilitate operating a wind turbine with less restrictive monitor set point limits when an atmospheric condition, for example, an air density, is conducive to higher monitor set point limit operation.

Exemplary embodiments of a wind turbine are described above in detail. The wind turbine and assemblies included within the wind turbine are not limited to the specific embodiments described herein, but rather each component may be utilized independently and separately from other components described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling operation of a wind turbine, the wind turbine comprising a rotor having a plurality of rotor blades, said method comprising:
   measuring an atmospheric condition associated with the environment surrounding the wind turbine;
   providing the measured atmospheric condition to a processor;
   determining at least one monitor set point limit
   modifying the at least one monitor set point limit based at least partially on the measured atmospheric condition; and,
   applying the at least one modified monitor set point limit to wind turbine operation.

2. A method in accordance with claim 1, wherein measuring an atmospheric condition comprises measuring at least one of an ambient air density, an ambient air pressure, an ambient air temperature, and a wind turbulence intensity.

3. A method in accordance with claim 1, wherein determining at least one monitor set point limit comprises determining at least one of an over speed set point limit, a blade pitch asymmetry set point limit, an operating temperature set point limit, and an operating vibration level set point limit based at least partially on the measured atmospheric condition.

4. A method in accordance with claim 3, wherein modifying the at least one monitor set point limit comprises modifying a pre-set monitor set point limit based at least partially on the measured atmospheric condition.

5. A method in accordance with claim 4, wherein modifying a pre-set monitor set point limit comprises increasing at least one of the over speed set point limit, the blade pitch asymmetry set point limit, the operating temperature set point limit, and the operating vibration level set point limit when at least one of:
  an air turbulence intensity is below a predetermined level;
  an ambient air temperature is above a predetermined level;
  an ambient air density is below a predetermined level; and,
  an ambient air pressure is below a predetermined level.

6. A method in accordance with claim 1, further comprising, determining at least one rated power set point based at least partially on the measured atmospheric condition.

7. A method in accordance with claim 1, wherein applying the at least one monitor set point limit to wind turbine operation comprises measuring at least one operating condition associated with wind turbine operation.

8. A method in accordance with claim 7, wherein measuring at least one operating condition comprises measuring at least one of a rotational speed of a shaft, a tower top vibration level, a variation of wind across a horizontal rotor plane, a variation of wind across a vertical rotor plane, a component operating temperature, a blade pitch, and a yaw error.

9. A method in accordance with claim 7, wherein applying the at least one monitor set point limit to wind turbine operation comprises shutting down the wind turbine if the measured operating condition meets or exceeds the monitor set point limit.

10. A method in accordance with claim 1, further comprising, storing predetermined monitor set point limits that correspond to potential atmospheric conditions.

11. A method in accordance with claim 10, wherein determining the at least one monitor set point limit comprises comparing the measured atmospheric condition to the potential atmospheric conditions and corresponding stored monitor set point limits.

12. A method for assembling a wind turbine configured to operate with at least one pre-set monitor set point limit, the wind turbine comprising a system controller, said method comprising:
  positioning an atmospheric condition sensor on or in close proximity to the wind turbine;
  coupling the atmospheric condition sensor to the system controller; and,
  configuring the system controller to modify the at least one pre-set monitor set point limit based on the measured atmospheric condition.

13. A method in accordance with claim 12, wherein positioning an atmospheric condition sensor on or in close proximity to the wind turbine comprises positioning at least one of an ambient air density sensor, an ambient air pressure sensor, an ambient air temperature sensor, and a wind turbulence intensity sensor.

14. A method in accordance with claim 12, further comprising, configuring the system controller to apply the at least one modified pre-set monitor set point limit to wind turbine operation.

15. A method in accordance with claim 14, wherein configuring the system controller to apply the at least one modified pre-set monitor set point limit to wind turbine operation comprises configuring the system controller to shut down the wind turbine if the at least one modified pre-set monitor set point limit is met or exceeded.

16. A method in accordance with claim 12, further comprising, configuring the system controller to determine at least one variable rated power set point based at least partially on the atmospheric condition measured by the atmospheric condition sensor.

17. A method in accordance with claim 12, wherein configuring the system controller to modify the at least one pre-set monitor set point limit comprises configuring the system controller to determine at least one of an over speed set point limit, a blade pitch asymmetry set point limit, an operating temperature set point limit, and an operating vibration level set point limit based at least partially on the measured atmospheric condition.

18. A method in accordance with claim 17, wherein configuring the system controller to modify the at least one pre-set monitor set point limit comprises configuring the system controller to increase at least one of the over speed set point limit, the blade pitch asymmetry set point limit, the operating temperature set point limit, and the operating vibration level set point limit when at least one of:
  an air turbulence intensity is below a predetermined level;
  an ambient air temperature is above a predetermined level;
  an ambient air density is below a predetermined level; and,
  an ambient air pressure is below a predetermined level.

19. A method for facilitating operating a wind turbine having at least one pre-set monitor set point limit, the wind turbine comprising a system controller, said method comprising:
  configuring an atmospheric condition sensor to provide the system controller with at least one atmospheric condition measurement; and,
  configuring the system controller to:
    receive the at least one atmospheric condition measurement,
    modify the at least one pre-set monitor set point limit based on the at least one atmospheric condition measurement and data stored in a memory coupled to the system controller, and,
    apply the at least one modified pre-set monitor set point limit to wind turbine operation.

20. A method in accordance with claim 19, wherein configuring the system controller to modify the at least one pre-set monitor set point limit comprises increasing the pre-set monitor set point limit by a predetermined amount when at least one of:
  an air turbulence intensity is below a predetermined level;
  an ambient air temperature is above a predetermined level;
  an ambient air density is below a predetermined level; and,
  an ambient air pressure is below a predetermined level.

21. A method in accordance with claim 19, wherein configuring the system controller to apply the at least one modified pre-set monitor set point limit comprises configuring the system controller to shut down the wind turbine if the monitor set point limit is met or exceeded.

22. A wind turbine control system comprising:
  an atmospheric condition sensor positioned on or in close proximity to a body of the wind turbine, said atmospheric condition sensor configured to measure at least one atmospheric condition; and,
  a processor coupled to said atmospheric condition sensor, said processor configured to:
    receive at least one atmospheric condition measurement from said atmospheric condition sensor,
    determine at least one monitor set point limit and,
    modify the at least one monitor set point limit based on the at least one atmospheric condition measurement and data stored in said memory device.

23. A wind turbine control system in accordance with claim 22, further comprising, a memory device coupled to said processor, said memory device configured to store potential atmospheric conditions and corresponding monitor set point limits in a database.

24. A wind turbine control system in accordance with claim 23, wherein said processor is further configured to modify a pre-set monitor set point limit based on the at least one atmospheric condition measurement and data stored in said memory device.

25. A wind turbine control system in accordance with claim 24, wherein said processor is further configured to increase the pre-set monitor set point limit by a predetermined amount when at least one of:
   an air turbulence intensity is below a predetermined level;
   an ambient air temperature is above a predetermined level;
   an ambient air density is below a predetermined level; and,
   an ambient air pressure is below a predetermined level.

26. A wind turbine control system in accordance with claim 22, wherein said processor is further configured to apply the at least one monitor set point limit to wind turbine operation.

27. A computer program embodied on a non-transitory computer readable medium for determining at least one pre-set monitor set point limit for a wind turbine, said program comprising at least one code segment that:
   receives measured atmospheric condition data provided by an atmospheric condition sensor; and,
   modifies the at least one pre-set monitor set point limit based at least partially on the received atmospheric condition data.

28. A computer program in accordance with claim 27, further comprising, at least one code segment that stores in a memory potential atmospheric conditions and corresponding monitor set point limits.

29. A computer program in accordance with claim 28, further comprising, at least one code segment that compares the measured atmospheric condition data provided by the atmospheric condition sensor to the stored atmospheric conditions and corresponding monitor set point limits.

* * * * *